United States Patent
Cohen

(10) Patent No.: US 9,800,415 B2
(45) Date of Patent: Oct. 24, 2017

(54) ELECTRONIC NAME REGISTRY TYPE

(76) Inventor: Robert H. Cohen, West Hollywood, CA (US)

(*) Notice: Subject to any disclaimer, the term of this patent is extended or adjusted under 35 U.S.C. 154(b) by 1707 days.

(21) Appl. No.: 12/868,060

(22) Filed: Aug. 25, 2010

(65) Prior Publication Data

US 2011/0055579 A1 Mar. 3, 2011

Related U.S. Application Data

(60) Provisional application No. 61/237,670, filed on Aug. 27, 2009.

(51) Int. Cl.
*H04L 9/32* (2006.01)

(52) U.S. Cl.
CPC ........ *H04L 9/3247* (2013.01); *H04L 2209/56* (2013.01); *H04L 2209/60* (2013.01)

(58) Field of Classification Search
CPC H04L 9/3247; H04L 2209/56; H04L 2209/60
USPC ............... 713/153, 156, 173, 176, 178, 193
See application file for complete search history.

(56) References Cited

U.S. PATENT DOCUMENTS

| | | | | |
|---|---|---|---|---|
| 6,161,181 A * | 12/2000 | Haynes, III | .......... | G06Q 20/382 380/37 |
| 6,367,013 B1 * | 4/2002 | Bisbee | .......... | G06Q 20/00 713/158 |
| 6,553,494 B1 * | 4/2003 | Glass | .......... | G06F 21/32 713/176 |
| 6,952,780 B2 * | 10/2005 | Olsen et al. | .......... | 726/26 |
| 7,051,206 B1 * | 5/2006 | Giest | .......... | G06Q 20/3674 380/282 |
| 7,814,328 B1 * | 10/2010 | Leonard et al. | .......... | 713/179 |
| 8,538,893 B1 * | 9/2013 | Moses | .......... | G06Q 20/02 705/75 |
| 2001/0002485 A1 * | 5/2001 | Bisbee et al. | .......... | 713/167 |
| 2001/0011350 A1 * | 8/2001 | Zabetian | .......... | 713/176 |
| 2002/0042879 A1 * | 4/2002 | Gould | .......... | G06Q 20/341 713/176 |
| 2003/0196090 A1 * | 10/2003 | Nagahama | .......... | H04L 9/3263 713/176 |
| 2005/0010776 A1 * | 1/2005 | Kenen | .......... | G06Q 20/341 713/176 |
| 2005/0228999 A1 * | 10/2005 | Jerdonek | .......... | H04L 63/0823 713/176 |
| 2006/0129445 A1 * | 6/2006 | McCallum, Jr. | .......... | 705/8 |
| 2006/0239254 A1 * | 10/2006 | Short et al. | .......... | 370/352 |
| 2006/0265590 A1 * | 11/2006 | DeYoung | .......... | H04L 9/3263 713/176 |
| 2007/0208943 A1 * | 9/2007 | Gupta | .......... | G06F 21/64 713/176 |
| 2007/0277042 A1 * | 11/2007 | Dietl | .......... | 713/176 |
| 2008/0022111 A1 * | 1/2008 | Dietl | .......... | 713/176 |
| 2008/0100874 A1 * | 5/2008 | Mayer | .......... | G06F 21/645 358/403 |

(Continued)

*Primary Examiner* — Thu Ha Nguyen
(74) *Attorney, Agent, or Firm* — Klein, O'Neill & Singh, LLP

(57) ABSTRACT

Digital signatures may be verified by maintaining a database of information of digital signatures and documents to which they were applied. Verification of electronically signed documents may be requested, with verification performed by comparing information of the electronically signed document with information in the database. The digital signatures may include graphic images, and may be transferred from one party to another.

11 Claims, 6 Drawing Sheets

(56) References Cited

U.S. PATENT DOCUMENTS

| | | |
|---|---|---|
| 2010/0161993 A1* | 6/2010 | Mayer .......................... 713/178 |
| 2013/0055358 A1* | 2/2013 | Short et al. ...................... 726/4 |
| 2013/0104162 A1* | 4/2013 | Helms et al. ................... 725/31 |
| 2013/0111212 A1* | 5/2013 | Baltes et al. .................. 713/176 |
| 2013/0117138 A1* | 5/2013 | Hazel et al. .................... 705/16 |
| 2013/0117387 A1* | 5/2013 | Tomkow ....................... 709/206 |
| 2013/0117572 A1* | 5/2013 | Berczes et al. ............... 713/178 |
| 2013/0122996 A1* | 5/2013 | Lutnick et al. ................. 463/25 |
| 2013/0124853 A1* | 5/2013 | Sorotokin et al. ............ 713/153 |
| 2013/0145154 A1* | 6/2013 | Kim et al. .................... 713/156 |
| 2013/0145178 A1* | 6/2013 | Jeffries et al. ................ 713/193 |
| 2015/0113282 A1* | 4/2015 | Basil ........................... 713/176 |

* cited by examiner

ELECTRONIC NAME REGISTRY TYPE

CROSS REFERENCE TO RELATED APPLICATIONS

This application claims the benefit of the filing date of U.S. Provisional Application No. 61/237,670, filed Aug. 27, 2009, entitled "Electronic Name Registry Type," the disclosure of which is incorporated by reference.

BACKGROUND OF THE INVENTION

The present invention relates generally to document verification, and more particularly to verification of electronic signatures for documents.

Many documents require signatures or other marks or notations to indicate adoption of the document by an individual or an entity. For example, contracts, tax returns, and other documents often require a signature or other mark to indicate that a person or entity validates the content of the document. Signatures are commonly used on hardcopy documents in this manner, although marks and other indications, such as chops, may also be used.

In many instances, documents are maintained or transmitted via electronic means. Difficulties may arise in storing or digitally transmitting documents which are intended to include a signature. In many instances, a signed document may be scanned, for example by a scanner, and then saved as a digital image or in a document format that is similar to a digital image. Unfortunately, some individuals or entities may not have easy access to a scanner or similar ordinance. In addition, such documents may be subject to security concerns. For example, it is possible that an otherwise valid signature could be taken from one document and inserted into an image of a second document, so as to provide a counterfeit signature for a document which the individual does not wish.

Individuals receiving electronically signed documents may therefore also question the validity of the received document.

BRIEF SUMMARY OF THE INVENTION

Aspects of the present invention provide for the verification of electronic signatures. In one aspect of the invention, the invention provides a method of providing for verification of electronic signatures, comprising: receiving signature verification information for an electronic document with a digital signature from a first party; storing the signature verification information for the electronic document in a memory; receiving a request for verification of signature for an allegedly digitally signed document from a second party, the request including at least some alleged signature verification information; determining if the at least some alleged signature verification information matches the signature verification information for the electronic document stored in the memory; and providing results of the determination to the second party.

In another aspect of the invention, the invention provides a computer coupled to a network, the computer configured by program instructions to: receive identifying information about a digital signature and a document to which the digital signature was applied; store in memory the identifying information; receive a request for verification of a digitally signed document, the request including information of a purported digital signature and a document to which the purported digital signature was applied; determine if the information of the purported digital signature and the document to which the purported digital signature was applied matches the identifying information about the digital signature and the document to which the digital signature was applied; and command transmission of results of the determination.

In another aspect of the invention, the invention provides a method of populating a document with a mark forming a digital signature, comprising: receiving a user name, a pass code, and a paste code; searching a document for the paste code if the user name and pass code match a valid user name and pass code; replacing the paste code with the mark; and transmitting identifying information about the document and the mark to a registry.

These and other aspects of the invention are more fully comprehended on review of this disclosure.

DETAILED DESCRIPTION

Figure 1:
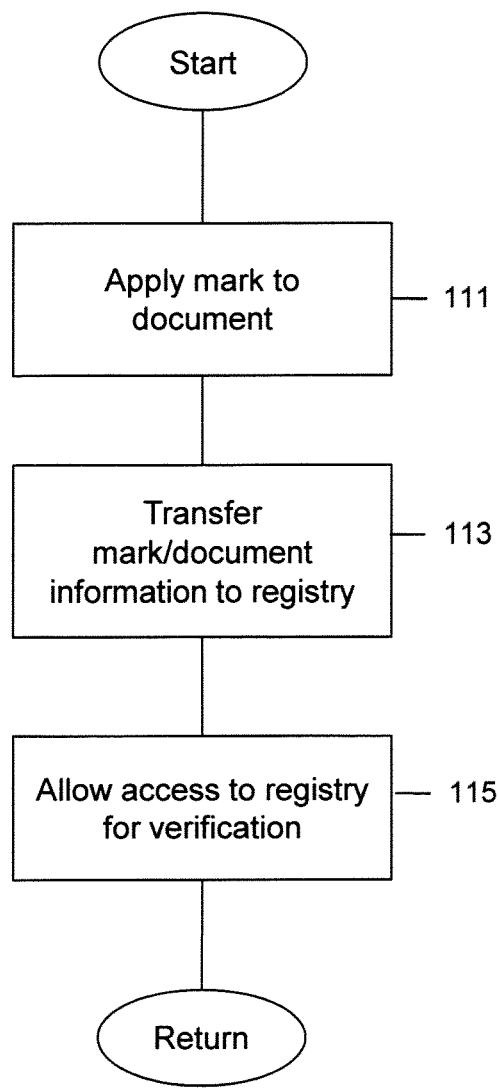
FIG. 1 is a flowchart of a process providing for verification of electronic signatures.

FIG. 1 is a flow diagram of a process providing for verification of electronic signatures for documents. The electronic signature is generally in the form of a mark, with application of the mark to the document indicating that an individual has signed the document. The process may be performed, for example, by computers coupled to a communications network. In some embodiments, the computers may be personal computers, but in various embodiments the computers may be cellular telephones, servers, computer tablets, or other devices including a processor or processor core.

In block 111 in the process applies a mark to a document. In some embodiments the process applies the mark to the document in response to a user input requesting that the mark be applied to the document. In block 113 the process transmits the mark and, in some embodiments, information of the document to a registry. In most embodiments an identification of an individual or entity from which the mark derives is also transmitted to the registry, along with, in many embodiments, a password for the individual or entity. In block 115 the process allows access to the registry for verification of the signature, or mark, for the document. In some embodiments the process allows access to the registry by providing information as to whether a mark is registered with the registry. In some embodiments the process allows access to the registry by providing information as to whether information of the mark complies with registry rules, or if information of the mark and information of a document to which a mark was applied matches information of the registry. The process thereafter returns.

Figure 2:
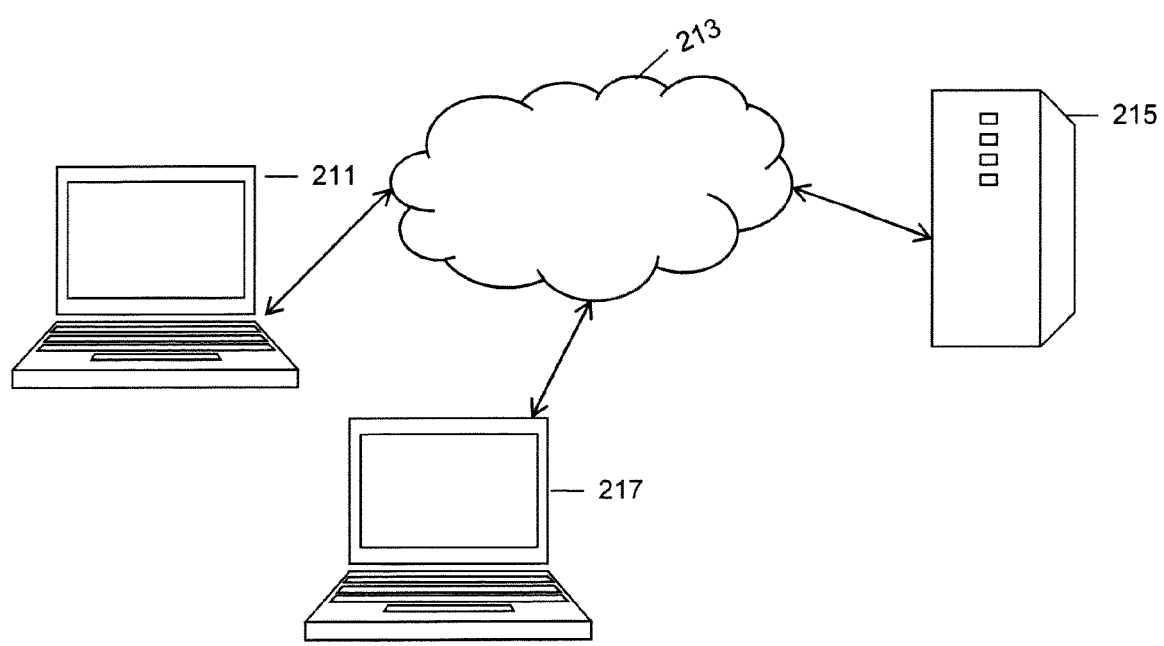
FIG. 2 is a block diagram of a system in accordance with aspects of the invention.

FIG. 2 is a block diagram of a system in accordance with aspects of the invention. In FIG. 2, a first computer unit 211 is data coupled to a network 213. A user operating the first computer unit may, for example, digitally sign a document. After digitally signing the document, information regarding the user and information regarding the signed document, which may be or include information of a mark used to digitally sign the document, is transmitted through the network 213, to a registry server 215. In some embodiments the first computer unit includes program instructions for applying the mark to the document, as commanded by a user of the first computer unit, and for transmitting, or commanding transmission of, the information regarding the user and the document to the registry server. In some embodiments the first computer unit transmits a request to sign the document to the registry server, and the registry server transmits the mark to the first computer unit, for use by the first computer unit is applying the mark to the document. In some embodiments the registry server additionally transmits program or scripting instructions to be run by the first computer unit to provide for application of the mark.

The registry server stores the information regarding the user and the information regarding the document. In some embodiments the information regarding the document may be a title of the document and a current date. In other embodiments the information regarding the document may be a code generated from the document, for example a hash code or a cyclic redundancy check (CRC) code. In some embodiments the information regarding the document is the entire document.

The first computer unit may also transmit an electronic version of the digitally signed document to a second computer unit 217. A user may command the second computer unit to transmit a request, through the network, for verification of the electronic signature for the document to the registry server. In many embodiments the request for verification includes the information regarding the user and the information regarding the document. The registry server determines if the information regarding the user and the information regarding the document matches previously stored information regarding the user and information regarding the document, and transmits, through the network, an indication of same to the second computer unit.

Figure 3:
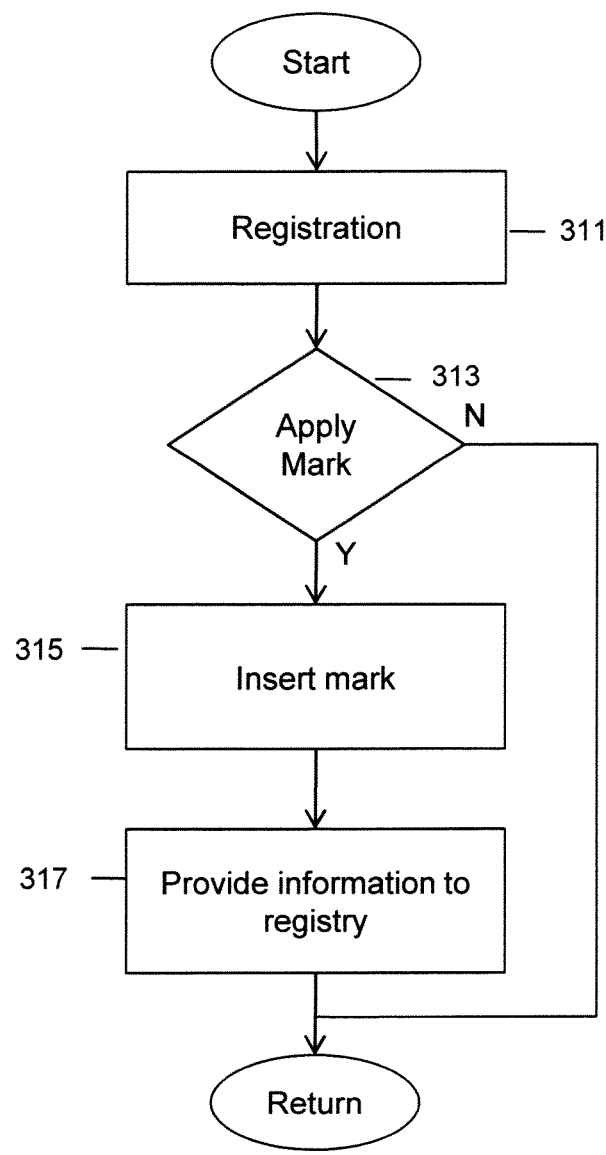
FIG. 3 is a flowchart for a process for registering an electronically signed document with a registry in accordance with aspects of the invention.

FIG. 3 is a flowchart of a process for registering a digitally signed document with a registry. In block 311 the process registers a user. Registration of the user includes receiving the user's identification information, and an indication of a mark desired for use via the user. In addition, the user supplies a password to be used for security or verification purposes. In some embodiments the operations of block 311 may only be performed for an initial user registration. The operations of block 311 may be performed by a registry server while the operations of the other blocks of the process of FIG. 3 may be performed by a user's computer, for example.

In block 313 the process determines if a mark should be applied to a document. If a mark is to be applied to a document, in block 315 the process inserts the mark into the document. In block 317 the process transmits information regarding the document and information regarding the user to the registry. The process thereafter returns.

Figure 4:
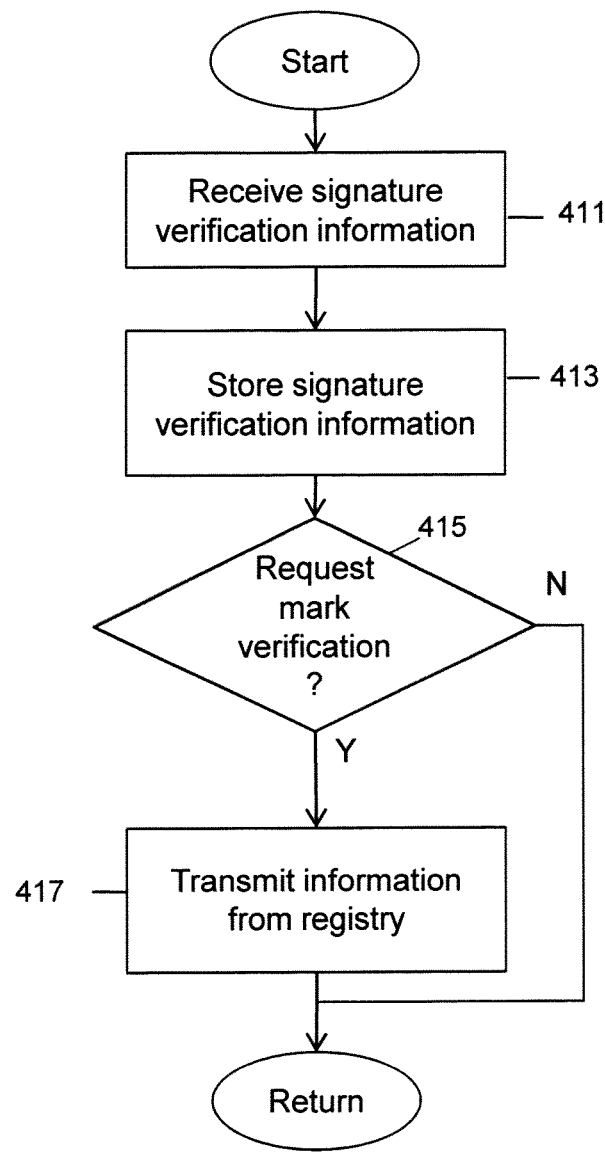
FIG. 4 is a flowchart of a further process providing for verification of an electronic signature in accordance with aspects of the invention.

FIG. 4 is a flow diagram of a process for verifying a digital signature. The process may be performed, for example, by a registry server or other computer configured by program instructions. In block 411 the process receives signature verification information. In some embodiments the signature verification information is identification of the signer and information of the document and/or information relating to application of the digital signature, or the document. In some embodiments the identification of the signer is an identification of a mark associated with the signer. In some embodiments the information relating to application of the signature for the document is a time a digital signature was applied to the document. In some embodiments information of the document is a title of the document, a number of pages of the document, and/or a code based on aspects of the document. In some embodiments information of the document is the document or a representation of the document. In block 413 the process stores the signature verification information.

In block 415 the process determines if there is a request for verification of a digital signature for the document. The request may be sourced by a computer of a recipient of a digitally signed document, for example. In some embodiments the request may include some or all of information of the digital signature and/or information of the digitally signed document. If there is a request for verification, in block 417 the process transmits information relating to verification of the digital signature. In general, the information indicates whether the digital signature for the document has been registered with the registry. In some embodiments the information is an indication that information of the digital signature and/or information of the document matches stored information. In some embodiments the indication of the match is provided by transmitting the stored document, so that for example a recipient may independently confirm that the document is the same as already possessed by the recipient.

Figure 5:
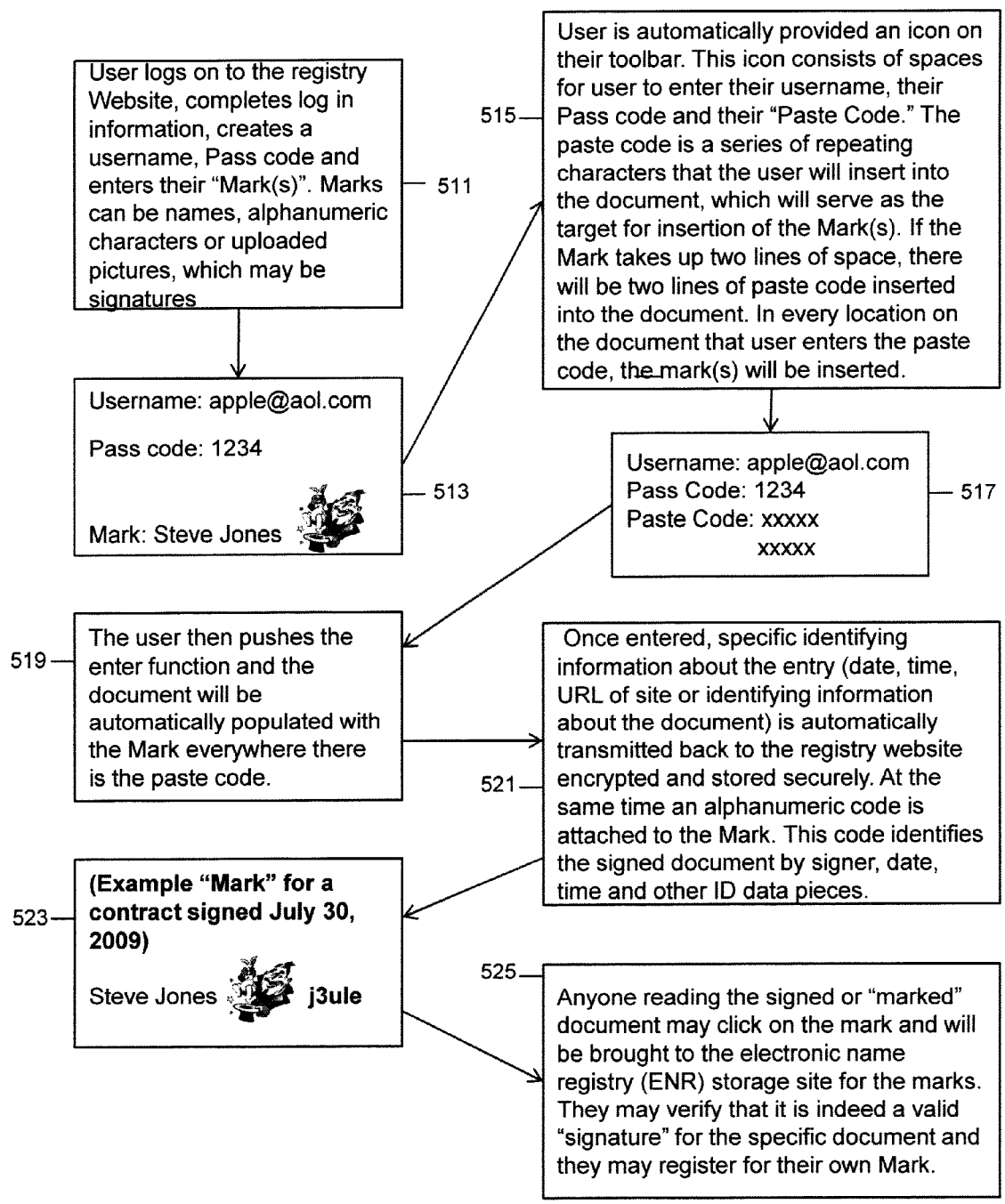
FIG. 5 is a flowchart of a process in accordance with aspects of the invention.

FIG. 5 is a flow diagram of a further process in accordance with aspects of the invention. In the block 511 a user registers a mark. For example, the user may log on to a registry website, completing login information, creating a user name, a pass code, and entering their mark. Marks can be names, alphanumeric characters, or uploaded pictures, which may include signatures. For example, a user name made be in the form of an e-mail address, such as apple@aol.com. Similarly, a pass code may be alphanumeric characters such as the 1234. The mark may be an alphabetical string of characters providing for example the user's name, as well as a graphical image. For example the graphical image may be of a magician pulling a rabbit out of a hat, as indicated in block 513. In block 515 the process provides the user an icon for a toolbar. The toolbar may be specifically for use with the registry, or may be an icon added to one or more toolbars of programs or applications of the user's computer. Selection of the icon may result in presentation of a window to allow the user to enter their username, their pass code, and a paste code. The paste code may be a series of characters that the user may insert into a document, with the paste code serving as a target for insertion of the mark. The number of lines of paste code preferably matches the number of lines required for display of the mark. The username may be at apple@aol.com, the pass code may again be 1234, and paste code may be a series of five repeating X's repeated on two lines.

In block 519 the process populates the document with the mark at every location in the document which includes paste code. In block 521 the process transmits to the registry website identifying information about the mark and the document. For example, the process may transmit the date at which the mark was populated within the document, the time at which the mark was populated in the document, identifying information of the document, or a uniform resource locator (URL) of a website for which the user inserts a digital signature, as in various embodiments the document may be a web page or a portion of a web page.

An alphanumeric code is also attached to the mark, such that the code may identify the signed document by signer date, time, and other identification data. Block 523 illustrates an example of a mark for a document signed Jul. 30, 2009. The mark includes the user's name and the graphical image, namely a magician pulling a rabbit out of a hat. In addition, the mark includes the code j3ule. The code may be the same for all applications of the mark, or, more commonly, may be algorithmically based on any, some, or all of the date of application, the number of documents signed that day or other period, the type of document, or other matters. In some embodiments the algorithm may be selected by or provided by the signer. The code may provide a straightforward way for the signer to determine, without access to the registry, whether the signer might have signed the document. In block 525 a person reading, electronically, the signed or marked documents may request verification of the signature from the registry. The process thereafter returns.

There may be times at which a particular mark may be deemed to have some intrinsic value. For example, use of a particular graphical image within a mark may be a considered by some or many to be desirable. In some embodiments, however, the registry may limit use of the particular images, names, or symbols are other aspects of the mark. In such instances, the mark or portions of a mark chosen by an individual may have little particular meaning to the individual, but may have great meaning to somebody else. In such instances the first individual may be willing to transfer the ability to use the mark or aspects of the mark to another person. Of course, there may be some detriment to the first person in doing so, and so the first person may require some valuable consideration in order to allow for transfer of the mark. Accordingly, in some embodiments the registry allows for transfer of a mark from one individual to another individual.

Figure 6:
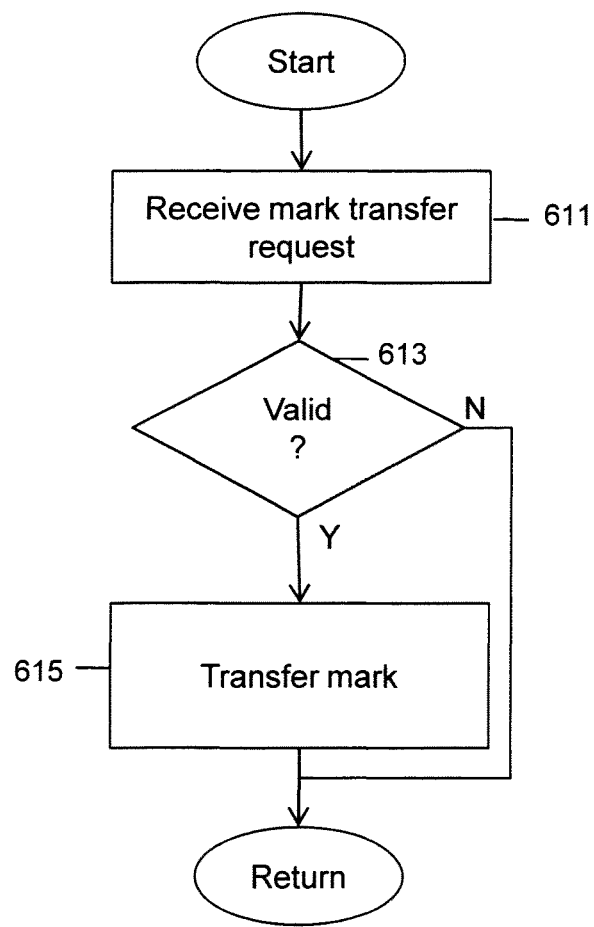
FIG. 6 as a flowchart of a process for transferring a mark in accordance with aspects of the invention.

FIG. 6 is a flow diagram of a process for transferring a mark. In some embodiments the process is performed by a registry server or other computer configured by program instructions. In block 611 the process receives a request to transfer a mark. In many embodiments a request for transfer of a mark will include identification of the mark, identification of the user requesting transfer of the mark, identification of a recipient of the mark, and a password or pass code of the user so that the registry may verify that the request to transfer the mark is valid. In block 613 the process determines if the request to transfer the market is valid. For example, the registry may check the password or pass code of the user requesting transfer of the mark. If the password or pass code is of the user currently owning the mark, the request may be considered valid. In block 615 the process transfers the mark to the recipient. In some embodiments the process also transfers payment for the mark received from the recipient to the user. The process thereafter returns.

Accordingly, aspects of the invention provide for verification of electronic signatures, and transfer of same. Although the invention has been described with respect to certain embodiments, it should be recognized that the invention comprises the novel and not obvious claims supported by this disclosure.

The invention claimed is:

1. A method of providing for verification of electronic signatures, comprising:
   receiving signature verification information for an electronic document with a digital signature from a first party, the signature verification information including at least a code based on a date of application of the digital signature to the document and at least some information of the document;
   storing the signature verification information for the electronic document in a memory;
   after receiving the signature verification information for the electronic document with the digital signature from the first party, receiving a request for verification of signature for an allegedly digitally signed document from a second party, the request including at least some alleged signature verification information;
   determining if the at least some alleged signature verification information matches the signature verification information for the electronic document stored in the memory; and
   providing results of the determination to the second party.

2. The method of claim 1 wherein the at least some information of the document is a code based on information of the document.

3. The method of claim 1 wherein the at least some information of the document is a representation of the document.

4. The method of claim 1 wherein the digital signature includes a name and a graphic image.

5. The method of claim 4 wherein the at least some information of the digital signature includes the graphic image.

6. The method of claim 1 wherein the electronic document is a web page.

7. A computer coupled to a network, the computer configured by program instructions to:
   receive identifying information about a digital signature and a document to which the digital signature was applied, the information about the digital signature including a date of application of the digital signature to the document;
   store in memory the identifying information;
   receive a request for verification of a digitally signed document, the request including information of a purported digital signature and a document to which the purported digital signature was applied;
   determine if the information of the purported digital signature and the document to which the purported digital signature was applied matches the identifying information about the digital signature and the document to which the digital signature was applied; and
   command transmission of results of the determination.

8. The computer of claim 7, wherein the digital signature includes a user selectable graphic image.

9. The computer of claim 8, wherein the computer is further configured by program instructions to receive requests for transfers of the digital signature from a first person to a second person.

10. The computer of claim 9, wherein the computer is further configured by program instructions to transfer the digital signature from the first person to the second person upon receipt of a request to transfer the digital signature and receipt of a password associated with the digital signature.

11. The computer of claim 10, wherein the computer is further configured by program instructions to transfer payment for the digital signature from the second person to the first person.

* * * * *